United States Patent
Desai (10) Patent No.: US 8,573,757 B2
(45) Date of Patent: Nov. 5, 2013

(54) METHODS AND APPARATUS OF MANUFACTURING MICRO AND NANO-SCALE FEATURES

(75) Inventor: Salil Desai, Greensboro, NC (US)

(73) Assignee: North Carolina Agricultural and Technical State University, Greensboro, NC (US)

(*) Notice: Subject to any disclaimer, the term of this patent is extended or adjusted under 35 U.S.C. 154(b) by 547 days.

(21) Appl. No.: 12/732,435

(22) Filed: Mar. 26, 2010

(65) Prior Publication Data

US 2010/0245489 A1  Sep. 30, 2010

Related U.S. Application Data

(60) Provisional application No. 61/163,484, filed on Mar. 26, 2009.

(51) Int. Cl.
*B41J 2/02* (2006.01)

(52) U.S. Cl.
USPC ............... 347/73; 347/74; 347/75; 347/78

(58) Field of Classification Search
USPC ........................................ 347/73–83
See application file for complete search history.

(56) References Cited

U.S. PATENT DOCUMENTS

| | | | |
|---|---|---|---|
| 4,005,435 A * | 1/1977 | Lundquist et al. | 347/75 |
| 6,273,559 B1 * | 8/2001 | Vago et al. | 347/74 |
| 6,509,917 B1 | 1/2003 | Chwalek et al. | |
| 6,863,385 B2 | 3/2005 | Jeanmarie et al. | |
| 6,921,906 B2 | 7/2005 | Hartley et al. | |
| 7,273,270 B2 * | 9/2007 | Katerberg | 347/76 |
| 2006/0007273 A1 * | 1/2006 | Punsalan et al. | 347/76 |
| 2007/0296773 A1 * | 12/2007 | Sharma et al. | 347/75 |

OTHER PUBLICATIONS

Desai S., Lovell M., & Cordle Jim, "Coupled field analysis of Piezoelectric Bimorph Disk in a Direct Write Fabrication Process," Composite B Journal, vol. 38, p. 824-832, 2007.

Desai S., Lovell M., "Statistical Optimization of Process Variables in a Continuous Inkjet Process for Direct Write Fabrication—A Case Study," International Journal of Industrial Engineering, vol. 15, No. 1, 104-112, 2008.

Chappell C., Desai S., Sankar J., "Computational Modeling of a Drop-on-Demand (DOD) Inkjet System for Understanding Microdroplet Behavior," ASME Early Career Technical Journal, vol. 6, No. 1, Oct. 2007.

Desai S., Lovell M., "Computational Fluid Dynamic Analysis of a Direct Write Manufacturing Process," International Journal of Nanomanufacturing, vol. 4, No. 3, pp. 171-188, 2009.

S.J. Chang, et al., "Preparation of nano-sized particles from collagen II by a high-voltage electrostatic field system" IEE Proc.-Nanobiotechnol., vol. 153, No. 1, Feb. 2006.

(Continued)

*Primary Examiner* — Henok Legesse
(74) *Attorney, Agent, or Firm* — Myers Bigel Sibley & Sajovec, P.A.

(57) ABSTRACT

The present invention provides methods of generating scalable patterned features on a substrate. The methods includes ejecting a succession of droplets; applying a force to the droplets in a manner such that the droplets travel along a designated path; altering the properties of one or more of the droplets in a manner so as to adjust the size of the droplets; and depositing the droplets on the substrate to generate patterned features on the substrate. The present invention also provides apparatuses for generating scalable patterned features on a substrate.

26 Claims, 6 Drawing Sheets

(56) References Cited

OTHER PUBLICATIONS

Doyle, D. R. Moffett and B. Vonnegut, "Behavior of Evaporating Electrically Charged Droplets", J. Colloid Sci., vol. 19, pp. 136143, 1964.

M. A. Abbas, and J. Latham, "The Instability of Evaporating Charged Drops," J. Fluid Mech., vol. 30, pp. 663670, 1967.

J. W. Schweizer, and D. N. Hanson, "Stability Limit of Charged Drops", J. Colloid Interface Sci., vol. 35, pp. 417423, 1971.

D. C. Taflin, T. L. Ward and E. J. Davis, "Electrified Droplet Fission and the Rayleigh Limit", Langmuir, vol. 5, pp. 376384, 1989.

C. B. Richardson, A. L. Pigg and R. L. Hightower, "On the Stability Limit of Charged Droplets", Proc. R. Soc. Lond., A., vol. 422, pp. 319328, 1989.

A. Gomez, and K. Tang, "Charge and Fission of Droplets in Electrostatic Sprays", Phys. Fluids, vol. 6, pp. 404414, 1994.

J. Choi, S. Kim, "Experimental evaluation of electrodynamically focused nanoparticle behavior in the quadrupole electric field", 2007 AAAR (American Association for Aerosol Research) Annual Conference.

M. Orme, J. Courter, Q. Liu, C. Huang, and R. Smith 'Electrostatic charging and deflection of non conventional droplet streams formed from capillary stream breakup, Physics of Fluids vol. 12, No. 9 Sep. 2000.

J. M. Schneider, N. R. Lindblad, and C. D. Hendricks, "Stability of an electrified liquid jet," J. Appl. Phys. 38, 6, 1967, 38, 2599, 1967.

K. Eiroma, L. Hakola, J. Hast, A. Maaninen and J. Petaja UV curing of electronic printing RADTECH Report Sep./Oct. 2007.

Heston, S.F., "Linear Quadrupole Focusing for High Resolution Microdroplet-Based Fabrication", MS Thesis: Mechanical Engineering, University of Pittsburgh, 2004.

J. Klang and J Balcerski, "UV Curing Technology: Issues for Inkjet Formulations," Technical Paper, Sartomer Company, Inc., 2008.

R. G. Sweet "High frequency recording with electrostatically deflected ink jets," Rev. Sci. Instrum. 36, 2.about.1965; 36, 131, 1965.

F. J. Kamphoefner, "Ink jet printing," IEEE Trans. Electron Devices ED-19, 584.about.1972.

G. L. Fillmore, W. L. Buehner, and D. L. West, "Drop charging and deflection in an electrostatic ink jet printer," IBM J. Res. Dev. 1, 37, 1977.

Desai S., Esho T., Kaware R., "Understanding Microdroplet Evaporation towards Scalable Micro/Nano Fabrication," Proceedings of the Industrial Engineers Research Conference, Mexico, 2010.

Y Shimotsuma et al. "Nanofabrication in transparent materials with a femtosecond pulse laser", Journal of Non-Crystalline Solids 352 (2006) 646-656.

S Hwan Ko, et al. "Fabrication of multilayer passive and active electric components on polymer using inkjet printing and low temperature laser processing", Sensors and Actuators A (2007) vol. 134, Issue: 1, pp. 161-168. Available online Jun. 14, 2006.

Antohe, B.V., and Walace, D.B., 2002. Acoustic phenomena in a demand-mode piezo-electric inkjet printer. J. Imaging Sci. & Technol. 46,409-414.

Asano, K., Saito, K., Yatsuzuka, K., 2003. Aerodynamic Effect of Charged Droplet Train Ejected from a 26 um Nozzle. IEEE Transactions on Dielectrics and Electrical Insulation, 10(1), 52-56.

Bieri, N. R., Chung, J., Poulikakos, D., and Grigoropoulos, C. P., 2004, "Manufacturing of nanoscale thickness gold lines by laser curing of a discretely deposited nanoparticle suspension," Superlattices and Microstructures, 437-444.

Bogy, D.B., Talke, F.E, 1984. Experimental and theoretical study of wave propagation phenomena in drop-on-demand ink jet devices. IBM Journal of Research and Development. 28(3), 314.

Bortolani, F., Dorey, R. (2009) Synthesis of spherical lead zirconate titanate (PZT) nanoparticles by electrohydrodynamic atomization. Advances in Applied Ceramics, 108(6), 332-337.

Brinley, E., Babu, K., Seal, S. (2007) The solution precursor plasma spray processing of nanomaterials. Journal of Minerals,Metals, and Materials Society, 59(7), 54-59.

Burns, S.E., Cain, P., Mills, J., Wang, J. and Sirringhaus, H., 2003, "Inkjet printing of polymer thin-film transistor circuits," Materials Research Society Bulletin, 28(11), 829-834.

Chrisey, D. B., 2000, "Materials Processing: The Power of Direct Writing," Science, 289(5481), 879-881.

Chryssolouris, G., Stavropoulos, P., Tsoukantas, G., Salonitis, K., Stournaras, A. (2004) Nanomanufacturing processes: a critical review.International Journal of Materials and Product Technology, 21(4), 331-348.

Davis, E. J., Ray, A.K. (1978). Submicron droplet evaporation in the continuum and non-continuum regimes. Journal of Aerosol Science, 411-422.

Essien, M., Armstrong, R. L., Gillespie, J. B. (1993). Lasing emission from an evaporating layered microdroplet. Optics Letters, 762-764.

Faeth, G.M. (1977) Current status of droplet and liquid combustion. Progress in Energy and Combustion Science, 3 (4), 191-224.

Fong, C., Black, N., Kiefer, P., Shaw, R. (2007) An experiment on the Rayleigh instability of charged liquid drops. American Journal of Physics, 75(6), 499-503.

Girshick, S. (2008) Aerosol processing for nanomanufacturing. Journal of Nanoparticle Research, 10(6), 935-945.

Han, X., Janzen, D.C., Vaillancourt, J., Lu, X. (2007) Printable highspeed thin-film transistor on flexible substrate using carbon nanotube solution. Micro & Nano Letters, 2(4), 96-98.

Hitoshi, T., Hiroshi, N., Yasushige, U. (2006). Droplet Evaporation of Alcohol Fuel by Radiative Heating. Japan Science and Technology Agency, 19-24 English Abstract.

Hon, K.K.B., Li, L., Hutschings, I.M. (2008) Direct writing technology—advances and developments. CIRP Annals—Manufacturing Technology, 57(2), 601-620.

Huang, Y., Wen, X., Goswami, B., Chrisey, D. (2007) Direct writing biological patterns & constructs onto fabrics. National Textile Center Research Briefs: Jun. 2007; NTC Project: F06-CL02, pp. 1-3.

Ishiyama, T., Yano, T., Fujikawa, S. (2005) Molecular dynamics study on the evaporation part of the kinetic boundary condition at the interface between water and water vapor, in Proceedings of the 24th International Symposium on Rarefied Gas Dynamics, pp. 491-496.

Jia, W., Qiu, H. (2002). Fringe probing of an evaporating microdroplet on a hot surface. International Journal of Heat and Mass Transfer, 4141-4150.

Jones, T., Gunji, M., Washizu, M., Feldman, M. (2001) Dielectrophoretic liquid actuation and nanodroplet formation. Journal of Applied Physics, 89(2), 1441-1448.

Jun, S., Zhaowei, Z., 2002. Finite element analysis of a IBM suspension integrated with a PZT microactuator. Sensors and Actuators A. 100, 257-263.

Kitayaporn, S., Hoo, J.H., Bohringer, K.F., Baneyx, F., Schwartz, D.T. (2010) Orchestrated structure evolution: accelerating directwrite nanomanufacturing by combining top-down patterning with bottom-up growth. Nanotechnology, 21(19), 195305-13.

Ko, S., Pan, H., Grigoropoulos, C., Luscombe, C., Frechet, J., Poulikakos, D. (2007). All-inkjet-printed flexible electronics fabrication on a polymer substrate by low-temperature high-resolution selective laser sintering of metal nanoparticles. Nanotechnology, 1-8.

Korlie, M.S. (2000) Three-dimensional computer simulation of liquid drop evaporation. Computers and Mathematics with Applications, 39(12), 43-52.

Kurland, HD., Grabow, J., Staupendahl, G., Andra, W., Dutz, S., Bellemann, M. E. (2007). Magnetic iron oxide nanopowders produced by CO2 laser evaporation. Journal of Magnetism and Magnetic Materials, 73-77.

Lee, J.S., Kim, Y.J., Kang, B.G., Kim, S.Y., Park, J., Hwang, J., Kim, Y.J. (2009) Electrohydrodynamic jet printing capable of removing substrate effects and modulating printing characteristics, in Proceedings of the IEEE 22nd International Conference on Micro Electro Mechanical Systems, IEEE, Piscataway, NJ, pp. 487-490.

Li, K.Y., Tu, H., Ray, A.K. (2005) Charge limits on droplets during evaporation. Langmuir, 21(9), 3786-3794.

Li, Q., Lovell, M., Mei, J., Clark, W., 2004. A study of displacement distribution in a piezoelectric heterogeneous bimorph. J. Mech. Des. 126(4), 757-762.

Lim, T., Han, S., Chung, J., Chung, J. T., Ko, S., Grigoropoulos, C. P. (2009). Experimental study on spreading and evaporation of inkjet (56) References Cited

OTHER PUBLICATIONS printed pica-liter droplet on a heated substrate. International Journal of Heat and Mass Transfer, 431-441.

Lin, Y., Hong, M.H., Chen, G.X., Lima, C.S., Tan, L.S., Wang, Z.B., Shi, L.P., Chong, T.C., 2007, "Hybrid laser micro/nanofabrication of phase change materials with combination of chemical processing," Journal of Materials Processing Technology, 340-345.

Lin, Y., Huang, Y., Chrisey, D. B., 2009, "Droplet formation in matrix-assisted pulsed-laser evaporation direct writing of glycerol-water solution," Journal of Applied Physics, 1-6.

Lisenkov, V.V., Osipov, V.V., Shitov, V.A. (2009). Research of Laser Evaporation of Fast-Moving Target. Laser Physics, 1192-1197.

Liu, Y., Cui, T., Varahramyan, K. (2003) All-polymer capacitor fabricated with inkjet printing technique. Solid-State Electronics, 47(9), 1543-1548.

Lu, G., Peng, X., Wan, X. (2009) An experimental investigation on spreading of droplets with evaporation and nucleation. Heat Transfer, Asian Research, 38(1), 40-50.

Mahalik, N., 2006, Micromanufacturing and Nanotechnology. Germany: Springer, Chapter 1—"Introduction," p. 1.

Maqua, C., Castanet, G., Grisch, F., Lemoine, F., Kristyadi, T., Sazhin, S.S. (2008). Monodisperse droplet heating and evaporation: Experimental study and modelling. International Journal of Heat and Mass Transfer, 3932-3945.

Michel, G., Staupendahl, G., Eberhardt, G., Muller, E., Oestreich, C. (1997). Production of nanosized zirconia-particles by CO2 laser evaporation. Proceedings of the 1997 5th Conference and Exhibition of the European Ceramic Society. Trans Tech Publication, 161-164.

Mikkilineni, S., Landry, E.S., McGaughey, A.J.H. (2007) Subcritical and supercritical nanodroplet evaporation: a molecular dynamics investigation, in Proceedings of the ASME-JSME Thermal Engineering Summer Heat Transfer Conference, pp. 775-782.

Moras, K., Schaarschuch, R., Riehemann, W., Zinoveva, S., Modrow, H., Eberbeck, D. (2005). Production and characterisation of magnetic nanoparticles produced by laser evaporation for ferrofluids. Journal of Magnetism and Magnetic Materials, 119-126.

Ng, J., Desmulliez, M., Lamponi, M., Moffat, B., McCarthy, A., Suyal, H., Walker, A., Prior, K., Hand, D., 2009, "A direct-writing approach to the micro-patterning of copper onto polyimide," Circuit World, 3-17.

Palm, L., Nilsson, J. (1998) Impact of droplet placement on paper by the level of droplet flight from stability in a continuous ink jet printer. International Symposium on Silver Halide Imaging, 42(6), 483-533.

Park, J., Hardy, M., Kang, S.B., Adair, K., Mukhopadhyay, D., Lee, C., Strano, M., Alleyne, A., Georgiadis, J., Ferreira, P., Rogers, J. (2007) High-resolution electrohydrodynamic jet printing. Nature Materials, 6(10), 782-789.

Sele, C.W., Werne, T.V., Friend, R.H., Sirringhaus, H. (2005) Lithography-free self-aligned inkjet printing with sub-hundred nanometer resolution. Advanced Materials, 17(8), 997-1001.

Sirringhaus, H., Shimoda, T., 2003, "Inkjet printing of functional materials," Materials Research Society Bulletin, 28(11), 802-806.

Sirringhaus, H., Kawase, T., Friend, R.H., Shimoda, T., Inbasekaran, M., Wu, W., Woo, E.P., 2000, "High-resolution inkjet printing of all-polymer transistor circuits," Science, 290 (5499), 2123-2126.

Szczech, J.B., Megaridis, C.M., Gamota, D.R., Zhang, J., 2002, "Fine-line conductor manufacturing using drop-on demand PZT printing technology," IEEE Transactions on Electronic Packaging Manufacturing, 25(1), 26-33.

Wang, Y. (2009) Nanomanufacturing technologies: advances and opportunities, in Proceedings of the 18th International Conference on Management of Technology.

\* cited by examiner

METHODS AND APPARATUS OF MANUFACTURING MICRO AND NANO-SCALE FEATURES

RELATED APPLICATION DATA

This application claims the benefit of U.S. Provisional Patent Application Ser. No. 61/163,484 filed Mar. 26, 2009, the disclosure of which is incorporated by reference herein in its entirety.

GOVERNMENT SUPPORT

Aspects of this research were supported by the NSF-CAREER Award No. 0846562. The U.S. Government has certain rights to this invention.

FIELD OF THE INVENTION

The present invention generally relates to the field of micro and nano-scale manufacturing.

BACKGROUND OF THE INVENTION

There exists a need for developing a micro/nano manufacturing process that has the ability to fabricate selective features at both the micro and nano scale. Also, such processes should be able to build multi-material features at scalable lengths (nano to micro scale ranges) extemporaneously.

The ability to fabricate structures from the micro to the nano-scale with varied geometry and high precision in a wide variety of materials is important in advancing the practical impact of micro and nano-technology.

Manufacturing of micro and nano-sized features has been achieved by using both contact and non-contact based technologies. However, when contact based technology is used, there is a possibility of contamination of the substrate from the tools. In addition, most known processes involve pre and post processing operations that are time consuming and may release hazardous material. Non-contact based processes, such as Pulse Laser Deposition (PLD) and Magnetron Sputtering, usually involve masking and may not be able to build selective features when needed.

SUMMARY OF THE INVENTION

Aspects of the present invention include the application of a controlled heat flux around a microdroplet periphery. A customized direct-write inkjet system equipped with a resistive heating ring fixture and a temperature proportional integral derivative (PID) controller may be employed. Additionally, a laser source with variable power modulation control may be employed. Controlled evaporation of mondispersed microdroplets to submicron and nanoscale dimensions can be achieved to provide the basis for generating particulate loaded (i.e., colloids, nanotubes, bio-media and the like) droplets for applications in micro and nanomanufacturing in the semiconductor, biotechnological and industrial sectors.

Thus, according to some embodiments of the present invention, provided herein are methods of generating scalable patterned features on a substrate. The methods comprise (1) ejecting a succession of droplets; (2) applying a force to the droplets in a manner such that the droplets travel along a designated path; (3) altering the properties of droplets in a manner so as to adjust the size of the droplets from micrometer to nanometer; and (4) depositing droplets on the substrate to generate patterned features on the substrate.

In some embodiments, the patterned features are three-dimensional. In another embodiment, the methods described herein further comprise repeating steps (1), (2) and/or (3) at least once.

In one embodiment, the ejecting step comprises selectively applying a force to a stream of fluid such that the stream breaks into a succession of monodispersed droplets. In another embodiment, the ejecting step further comprises varying the properties of the force to control the characteristics of the droplets.

In one embodiment, the ejecting step comprises providing a piezoelectric nozzle, wherein a piezoelectric disk is located in the nozzle.

In one embodiment, the ejecting step provides droplets in the size of microns. In another embodiment, the applying step comprises charging the droplets. In a different embodiment, the altering step comprises applying a heating or laser source to the droplets.

According to another aspect of the present invention, an apparatus for generating scalable patterned features on a substrate is provided. The apparatus comprises (1) a means for droplet forming and ejecting a succession of droplets; (2) a means for altering the properties of droplets in a manner so as to adjust the size of the droplets from micrometer to nanometer; and (3) one or more stream deflectors to control the direction of the droplets to generate patterned features on the substrate. Yet, according to some embodiments of the present invention, an apparatus comprises (1) the continuous ink jet, (2) quadrupole assembly, and one or more stream deflectors.

Objects of the present invention will be appreciated by those of ordinary skill in the art from a reading of the Figures and the detailed description of the embodiments which follow, such description being merely illustrative of the present invention.

BRIEF DESCRIPTION OF THE DRAWINGS

The following drawings form part of the present specification and are included to further demonstrate certain aspects of the present invention. Aspects of the invention may be better understood by reference to one or more of these drawings in combination with the detailed description of specific embodiments presented herein.

DETAILED DESCRIPTION

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

All patents, patent applications and publications referred to herein are incorporated by reference in their entirety. In case of a conflict in terminology, the present specification is controlling.

Provided herein, according to some embodiments of the invention, are methods of generating scalable patterned features on a substrate. The methods comprise (a) ejecting a succession of droplets; (b) applying a force to the droplets in a manner such that the droplets travel along a designated path; (c) altering the properties of droplets in a manner so as to adjust the size of the droplets and (d) depositing droplets on the substrate to generate patterned features on the substrate. In some embodiments, during the altering step (c), the size of the droplets is adjusted from micrometer to nanometer.

In some embodiments, the patterned features are three-dimensional. In another embodiment, the droplets comprise colloids of one or more material. Any applicable material may be used in the present invention. In some embodiments, the material is selected from the group consisting of metal, ceramics, fiber glass, semiconductors, polymers, bio-media (for example, drugs, cell lines, growth factors, and the like), a precursor solution for sol-gel process and a combination thereof. In some embodiments, the droplets are deposited via hydrophobic or hydrophilic patterns. In other embodiments, the droplets comprise polymer fluid.

In another embodiment, the methods further comprise repeating steps (a), (b) and/or (c) at least once. For example, a second or more tiers of droplets may be deposited to build multiple layers of nano or micro sized features. In some embodiments, the multiple application of depositing droplets may provide three-dimensional patterned features.

In one embodiment, the method further comprises the step of curing or gelation of the droplets after steps (a)-(c). In some embodiments, the step of curing may be carried out by adding chemical additives, exposing to ultraviolet radiation and/or electron beam or heat. In some embodiments, the method further comprises a curing or gelation process for polymer fluids. For example, an ultra violet curing process and/or gelation may be adopted for polymer fluids.

In some embodiments, the methods of the present invention further comprise heating the substrate to remove a solvent. For example, when the droplets are deposited via a solution and after the fluid droplets are deposited, the substrate may be soft-baked in-situ on a hot plate to remove volatile solvents and consolidate the deposited layer.

As used herein, "curing" is a process by which a polymer is toughened or hardened by cross-linking of polymer chains, brought about by chemical additives, ultraviolet radiation, electron beam and/or heat.

Stage 1—Ejecting Step (a)

In some embodiments, the ejecting step comprises selectively applying a force to a stream of fluid such that the stream breaks into a succession of droplets. In one embodiment, the ejecting step further comprises varying the properties of the force to control the characteristics of the droplets. In another embodiment, the ejecting step comprises providing a piezoelectric nozzle, wherein a piezoelectric disk may be located in the nozzle. Yet, in one embodiment, the force may be applied to the disk, and the force may be controlled to adjust the size, velocity and/or the ejecting rate of droplets.

In another embodiment, the ejecting step may be performed by a droplet forming mechanism that includes a customized inkjet setup. The customized inkjet set up may further include a continuous inkjet setup as known and described in, for example, U.S. Pat. No. 6,863,385 and U.S. Pat. No. 6,509,917, which are incorporated by reference in their entireties.

In some embodiments, the droplet forming mechanism may include a piezoelectric nozzle assembly where a stream of fluid is supplied at a high pressure (e.g. 5 to 50 psi). A piezoelectric disk may be located in the piezoelectric nozzle assembly and vibrates at high frequencies (e.g. from 1 KHz to 1 MHz) to generate acoustic waves. In some embodiments, the voltage and frequency of excitation of the piezoelectric disk may be varied. For example, increasing the voltage applied to the disk may result in a higher amplitude of vibration, and the fluid may break into larger droplet sizes. Another example is when a higher frequency of piezoelectric disk excitation is applied, the droplets may have a higher rate, and therefore, the temporal dimension is controlled.

In a different embodiment, the ejecting step further comprises controlling the orifice diameter of the nozzle to adjust the dimension of the droplets. In one embodiment, the ejecting step provides droplets in the size of microns. In some embodiments, the size of the nozzle may be varied from 100 microns to a few microns (for example, 1-10) based on the orifice diameter. In another embodiment, the spatial dimension of the droplets may be adjusted by varying the orifice diameter of the nozzle. In other embodiments, droplets may be generated at micrometer sizes during the ejecting step and then reduced to nanometer size in the later stage, for example step (c) the altering step.

In the present invention, the properties that affect droplet formation include, but are not limited to, viscosity and surface tension of the stream of fluids provided to the piezoelectric nozzle assembly. For example, fluids with higher viscosity may require higher voltages for exciting the piezoelectric disk; fluids with higher surface tension properties may require higher excitation of the piezoelectric disk to form consistent monodispersed microdroplets.

Stage 2—Applying (b) and Altering Steps (c):

In some embodiments, the applying step comprises charging the droplets. In another embodiment, the altering step comprises applying a heating or laser source to the droplets.

In some embodiments, a quadrupole mechanism may be used to guide the droplets in a straight line path. The exemplary quadrupole mechanism is described in Heston, Stephen F, *Linear quadrupole focusing for high resolution Microdroplet-based fabrication*, MS theses, Mechanical engineering, University of Pittsburgh, 2002. The properties of the droplets may be altered during their path of flight. Several mechanisms including, but not limited to, resistive heating and laser-based curing, may be employed to change the physical, magnetic and electric properties of the droplets during path of flight. For example, if a heat source is used, the heat intensity may be controlled to reduce sizes of droplets from micrometer to nanometer by evaporating the solvent. If the heat source is not applied, the droplet size may remain within the micrometer range with reduction in size only due to evaporation effect. In other embodiments, the magnetic and electrical properties of droplets may be adjusted by changing the laser wavelengths, pulse width (i.e., duration) and/or source intensity. Other applicable parameters of droplets include, but are not limited to, fluid properties such as viscosity, density, surface tension, conductivity and/or percent solids (particle concentration) in solvent base colloids. In some embodiments, the heat or laser source may be attenuated or switched off to obtain micrometer to sub-micrometer features.

In some embodiments, a linear quadrupole system may be used to focus the charged microdroplets and manipulate their fluid properties. The associated stability conditions may be predicted from the governing conditions (See Rayleigh, *On the Equilibrium of Liquid Conducting Masses Charged with Electricity*, Phil. Mag., Vol. 5, 14, 184-186, at 1882.). A linear quadrupole comprises four electrodes with their axes at the corners of a square. By connecting the electrodes and applying AC voltage across adjacent rods, particles of a certain charge to mass ratio may be focused during their path of flight. The focusing quadrupole will allow an interval in which the properties of the droplet may be altered for additive fabrication.

For a droplet with radius $a_0$, surface tension $\gamma$ and charge Q, the spherical shape remains stable as long as the fissility X is less than one.

$$X = \frac{Q^2}{64\pi^2 \varepsilon_0 \gamma a_0^3} < 1$$

To prevent the spontaneous disintegration of droplets due to electrostatic repulsion of the like charges residing on the surface of the droplet, the AC voltages on the quadrupole electrodes may be adjusted to stay below the Rayleigh limit. Another method of controlling the charge on droplets is to vary the charge potential being impressed by the charge tunnel when the droplets are initially charged when they exit from the nozzle orifice as described in stage 1.

Stage 3 Depositing Step (d)

In one embodiment, the droplets are charged and the depositing step comprises deflecting charged droplets to generate patterned features on the substrate. In some embodiments, the deflection of the charged droplet depends on the strength of the electric field through which it travels. The equations of motion for a charged droplet traveling through an electric field of intensity E are given as:

$$m\frac{dv_x}{dt} = QE - D\sin\theta,$$

$$m\frac{dv_z}{dt} = mg - D\cos\theta,$$

If the undeflected droplet stream is aligned with the z coordinate which is parallel to the gravity vector, and the magnitude of the deflection is measured in the perpendicular x coordinate. Here vx and vz are the components of velocity in the x and z coordinates. In the above, g is the gravitational acceleration, and D is the aerodynamic drag force.

Fillmore [1977] predicted the deflection distance as:

$$x_d = \frac{QE}{mv_0^2} l_{dp}\left(z_p - \frac{l_{dp}}{2}\right),$$

Where Q is charge, m is mass, $v_o$ is initial stream speed, $x_d$ is the deflection of a droplet, $z_p$ is the distance from the deflection plate entry to the substrate, and $l_{dp}$ is the length of the deflection plates. The prediction neglects the effects of gravity, drag, and/or mutual electrostatic interactions.

In other embodiments, the placement of droplets may be controlled by the positioning of the substrate. The crystal growth, material composition and morphology of the droplets may be controlled by the temperature gradients around the droplets and may be adjusted by the heating-cooling cycles.

According to some aspects of the present invention, the methods described herein may be used to selectively manufacture heterogeneous structures both in terms of geometry and material composition. In some embodiments, the methods described herein may further comprise substrate treatments. For example, sintering, curing, or other functionalizing, may be performed on the features.

As one of ordinary skill in the art may appreciate, the parameters described herein may vary greatly depending on the material/droplets. Such modifications are known to those skilled in the art.

Apparatus

Another aspect of the present invention provides an apparatus for generating scalable patterned features on a substrate. The apparatus comprises (1) a means for droplet forming and ejecting a succession of droplets; (2) a means for altering the properties of droplets in a manner so as to adjust the size of the droplets from micrometer to nanometer; and (3) one or more stream deflectors to control the direction of the droplets to generate patterned features on the substrate.

In one embodiment, the means for droplet forming may be selected from a continuous ink jet (CIJ), drop-on-demand (DOD) or thermal inkjet (TIJ) method. In another embodiment, the continuous ink jet comprises piezoelectric nozzle assembly. Yet, in a different embodiment, the piezoelectric nozzle assembly comprises a piezoelectric disk. In one embodiment, the means for altering the properties of droplets comprises a charge tunnel and a quadrupole assembly. In another embodiment, the means for altering the properties of droplets further comprise a heating, laser source, or a combination thereof.

The present invention will now be described in more detail with reference to the following examples. However, these examples are given for the purpose of illustration and are not to be construed as limiting the scope of the invention.

EXAMPLES

Example 1

Figure 1:
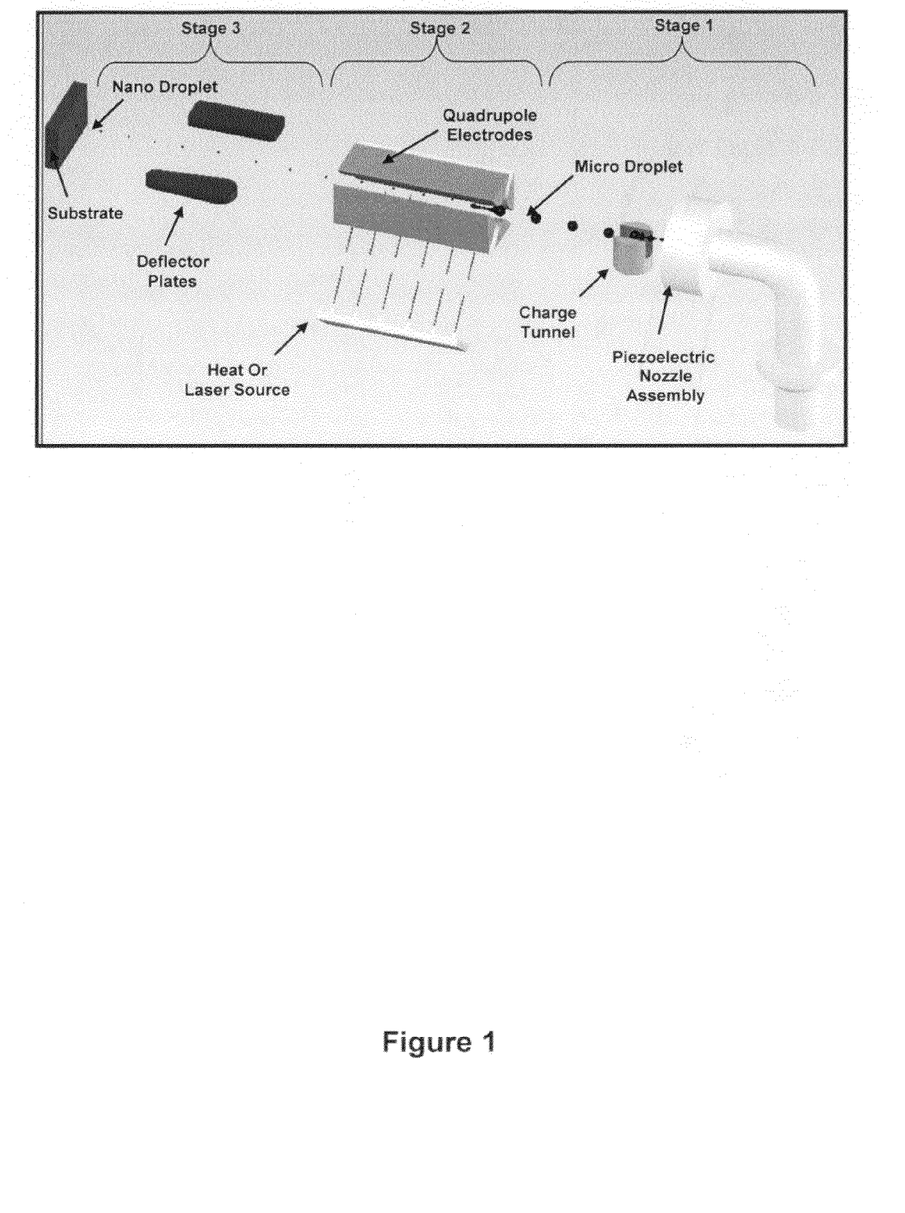
FIG. 1 is a schematic illustration of the apparatus of micro/nano manufacturing process.

Stage 1—Customized Continuous Inkjet-Based Microdroplet Generation:

As shown in FIG. 1, a customized continuous inkjet (CIJ) setup may be utilized to generate microdroplets. Fluid is supplied at a high pressure (5 to 50 psi) to a piezoelectric (PZT) nozzle assembly to generate a fluid jet. A piezoelectric disk located within the PZT nozzle assembly vibrates at high frequencies (variable from 1 kHz to 1 MHz) generating acoustic waves. A combination of Rayleigh instabilities and forced acoustic waves create standing nodes on the surface of the ejected jet, causing it to break up into fine droplets. (See Rayleigh, *On the Instability of Jets, Proceedings of the London Mathematical Society,* 10 (4), 4-13 (1878). Depending on the fluid properties, piezoelectric disk excitation parameters and nozzle geometry, droplet diameters can vary from 1 to 2.5 times the nozzle orifice diameter. The inkjet process described above involves a complex interaction of three domains: electrostatic, structural, and fluid. More importantly, the drop generation mechanism occurs at particular spatial and temporal dimensions. For example, at 1 MHz frequency each drop is formed at around 1 microsecond and can have dimensions to the order of 1-5 μm. Further, each droplet is charged before break-off from the jet in a charge tunnel. These charged droplets are fed to a quadrupole mechanism.

Stage 2 Quadrupole Mechanism

Figure 2:
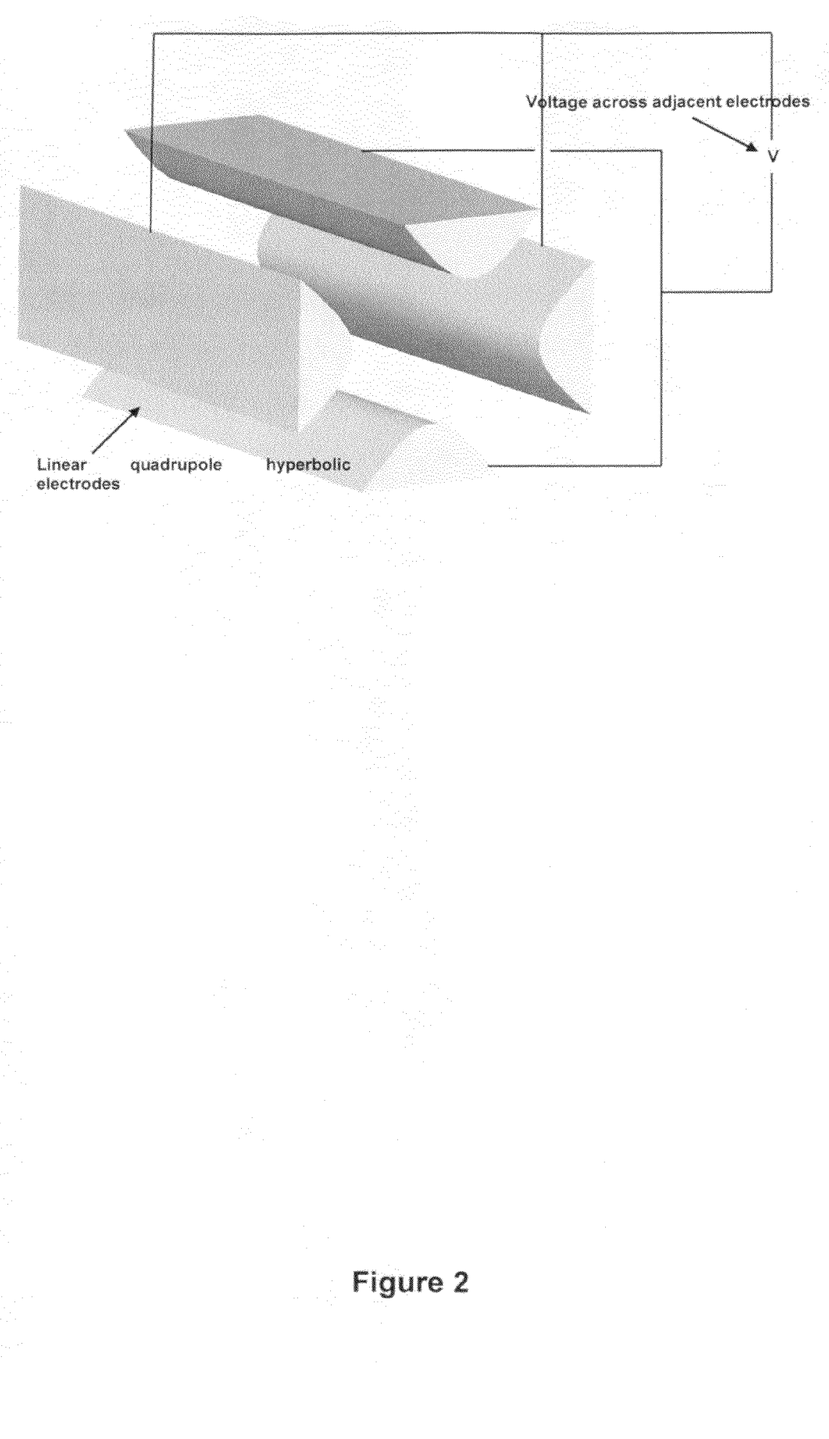
FIG. 2 is a schematic showing of the geometry of a linear quadrupole with hyperbolic electrodes.

As shown in FIG. 1, the quadrupole mechanism acts as a guide way to constrain the path of the droplet motion. It consists of four electrodes arranged with their axes at right angles to each other. By connecting the electrodes, as shown in FIG. 2 and applying an AC voltage across adjacent electrodes, charged fluid microdroplets of a certain charge-to-mass ratio are focused as they travel through the electrode length. The constrained motion of the microdroplets allows for a sufficient time interval in which the properties of the droplets can be altered during their path of flight. The droplet may be adjusted from a microdroplet (1 to 5 μm) to a nano-droplet (80 to 200 nm).

Stage 3 Deflector Plate Mechanism

As shown in FIG. 1, on exit from the quadrupole mechanism the droplet is deflected onto the substrate using a deflector plate mechanism. This mechanism consists of two high voltage plates which deflect the droplet based on the potential equilibrium. These deflector plates can be charged at variable voltages depending on the droplet pattern to be generated on the substrates. The principle of electric field based deflection of charged particles is described in U.S. Pat. No. 6,509,917, which is incorporated by reference in its entirety.

Example 2

Comparison of Different Fluid Types

Nanopure distilled water and 99.998% filtered acetone were the two fluids used as candidate fluids with specific heats of 75.33 and 126.66 (J/mol·K) respectively. This comparison enabled the assessment of the significance of specific heat of fluids (e.g., low vs. high) on droplet evaporation. The other factor investigated was the impact of nozzle diameter (50 μm vs. 30 μm), which can determine the effect of surface to volume ratio on droplet evaporation. Both fluids were jetted using a customized direct-writing inkjet system (MicroFab Technologies Inc., Plano, Tex.). The system included a Jet-Drive III waveform generator and amplifier, a pneumatics console, optics system and a MJ-AT-01-30 piezoelectric (PZT) microvalve with an interchangeable orifice (i.e., nozzle) diameter of 30 and 50 μm. Monodispersed microdroplets were generated and subjected to convective heat flux using a resistive heating ring fixture (Mid Atlantic Heater and Control Inc., SC) equipped with a controller.

The experimental conditions included jetting both fluids (water and acetone) from two different nozzle diameters (30 μm and 50 μm). The temperature of the resistive heating ring fixture was adjusted to evaporate the droplets from each experimental condition as shown in Table 1 below. The initial droplet condition (i.e., without the heating ring) for each experiment was recorded at room temperature (25° C.). The reductions in droplet for temperatures from 200° C. to 400° C. in increments of 50° C. were recorded.

TABLE 1

Experimental Conditions

| Condition No. | Nozzle Diameter | Fluid type | Ring temperature range (° C.) |
|---|---|---|---|
| 1 | 50 microns | Acetone | 200-400 |
| 2 | 30 microns | Acetone | 200-400 |
| 3 | 50 microns | Distilled water | 200-400 |
| 4 | 30 microns | Distilled water | 200-400 |

A charge coupled device (CCD) camera with a microscopic zoom lens was employed to capture microdroplet formation and their trajectories during their path of flight as they were jetted from the nozzle orifice. A light emitting diode (LED) source was synchronized with the piezoelectric actuator to provide illumination for observing the droplets. Once a stable monodispersed droplet condition was achieved, the heating ring fixture was positioned to envelope the droplets for evaporation. Image acquisition software (ImageJ) from the National Institute of Health (NIH) was used to analyze the droplet evaporation. A copper wire with predefined dimension was introduced in the frame during image capture to calibrate the microdroplet dimensions. Droplet surface area and volume were calculated for each experimental condition to observe reduction in its size with variations in the temperature.

Percentage Reduction in Droplet Volume

Figure 3:
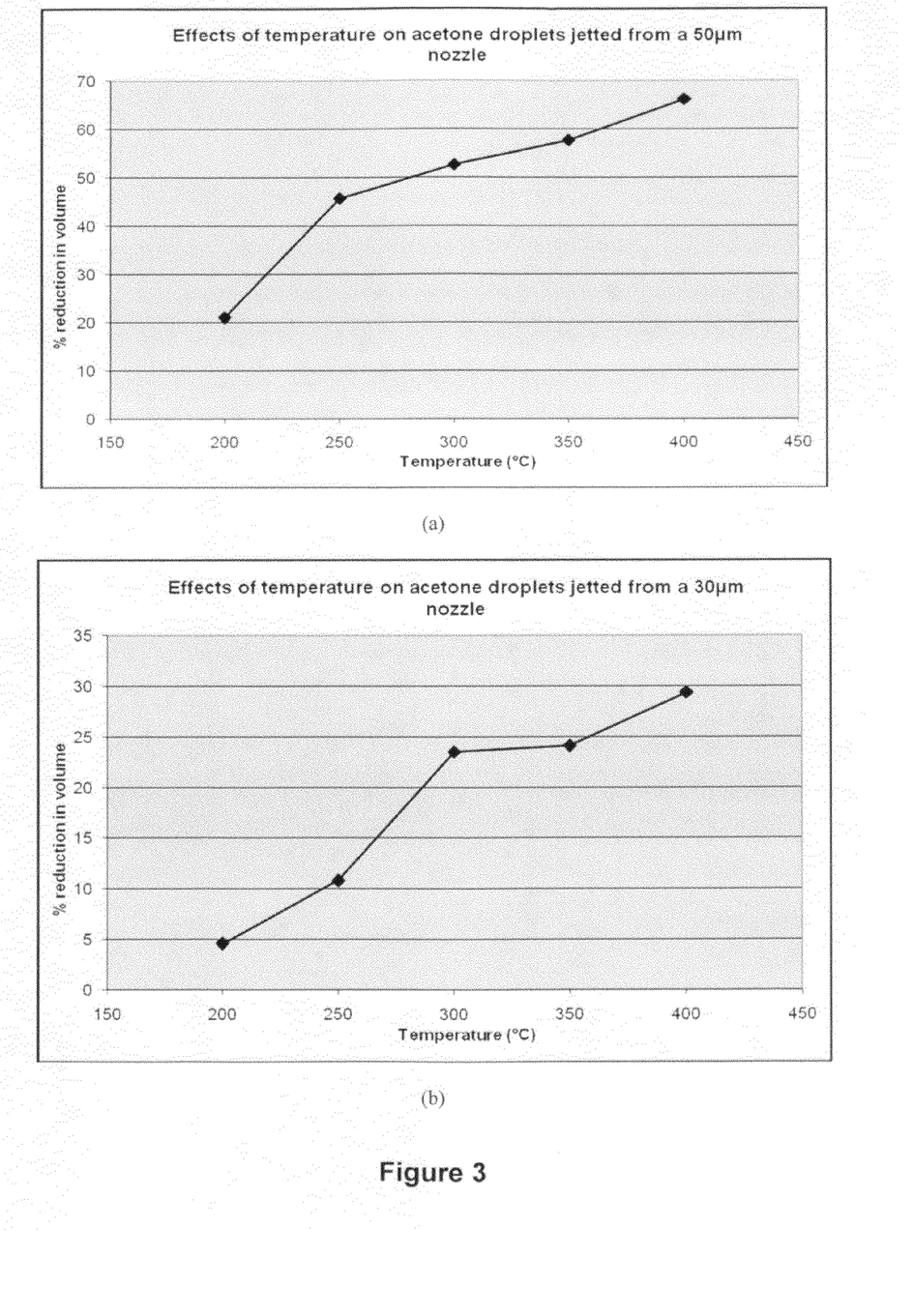
FIG. 3 shows results of experiments comparing temperature and volume reduction for candidate fluids acetone and water.

For each of the four experimental conditions, a proportional relationship between percentage volume reduction and incremental temperature (shown in FIG. 3) was observed. A 50 μm nozzle size yielded higher percentage reductions in volume over the 30 μm nozzle size for both the fluid types.

Effect of Fluid Type

Figure 4:
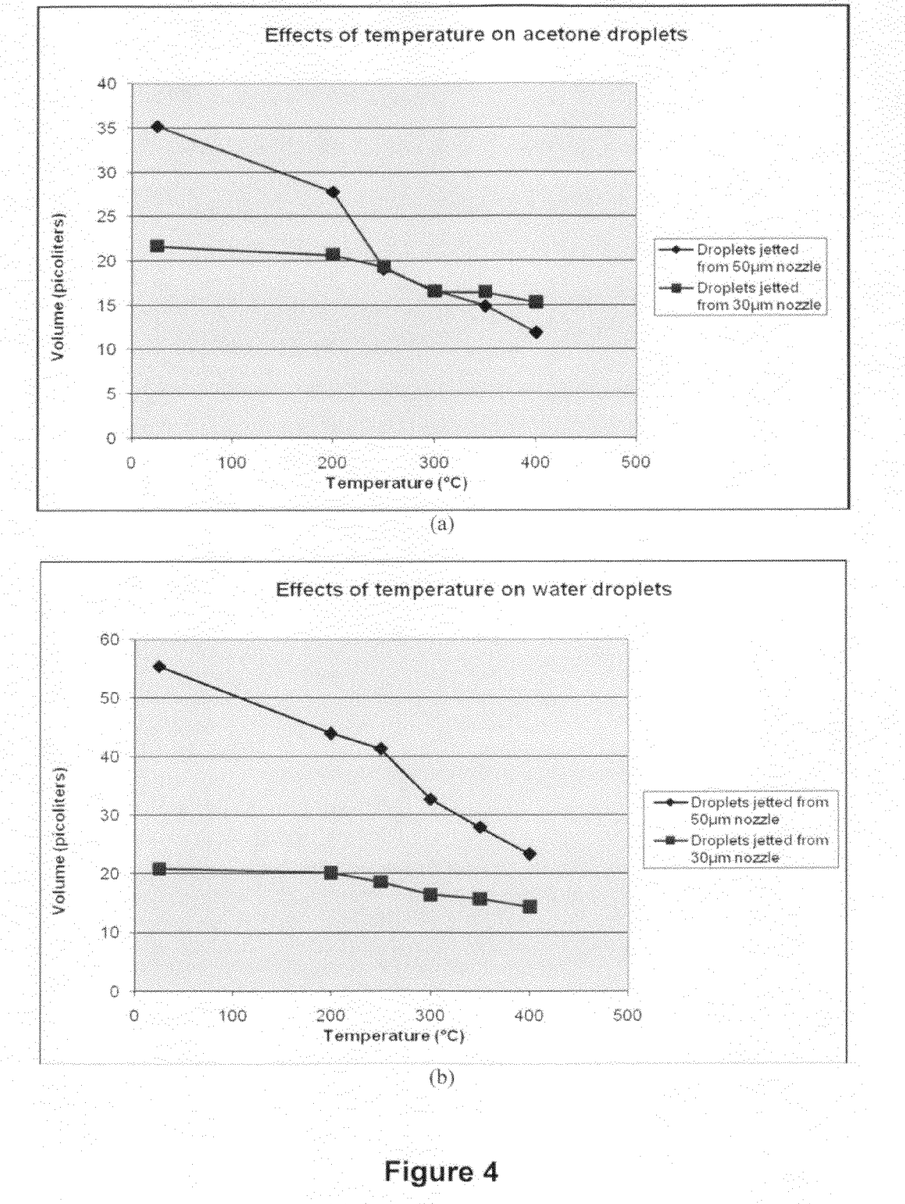
FIG. 4 shows results of experiments comparing evaporation characteristics for candidate fluids acetone and water.

Based on the fluid type, acetone was observed to evaporate at a higher rate with an increase in the temperature as shown in FIG. 4.

Effect of Surface Area to Volume Ratio

Figure 5:
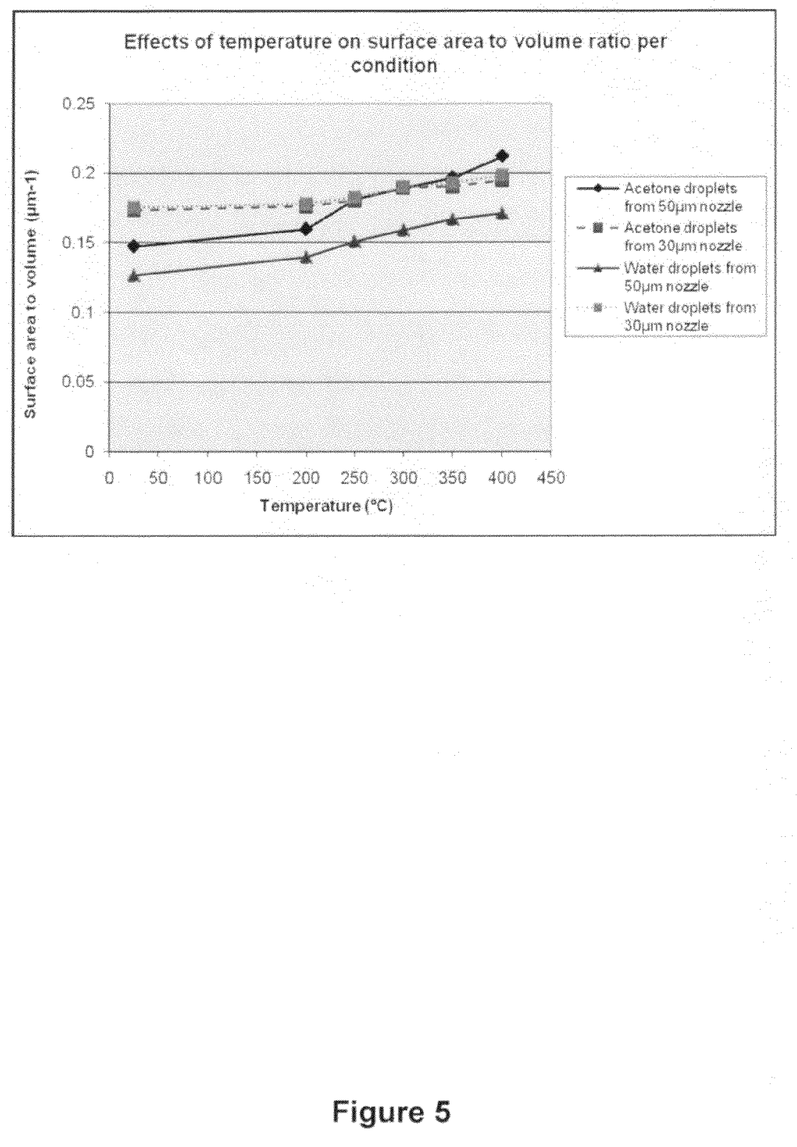
FIG. 5 shows results of experiments comparing evaporation characteristics for candidate fluids acetone and water based upon surface-to-volume ratio of microdroplets.

The effect of surface to volume ratio on droplet evaporation was observed as shown in FIG. 5. Fluids when jetted through smaller nozzles size resulted in higher surface to volume ratio and vice versa. However, as the temperature increased, a 50 μm acetone droplet evaporated at much faster rates than the 30 μm size droplets resulting in higher surface-to-volume ratio at higher temperatures.

In conclusion, the droplet evaporation characteristics for water and acetone were studied to understand the microdroplet size reduction phenomenon. A proportional reduction in the volume of the microdroplets of water and acetone was observed with an increase in heat flux. Acetone microdroplets exhibited more percentage volume reduction compared to that of water under the same conditions. Also for both fluids, droplets jetted with the 50 μm diameter nozzle were observed to have higher percentage volume reductions than those jetted with the 30 micron nozzle. Droplets with higher surface area to volume ratio evaporated at a faster rate.

REFERENCES

1. Desai S., Lovell M., & Cordle Jim, "Coupled field analysis of Piezoelectric Bimorph Disk in a Direct Write Fabrication Process," *Composite B Journal,* Vol. 38, pg 824-832, 2007.

2. Desai S., Lovell M., "Statistical Optimization of Process Variables in a Continuous Inkjet Process for Direct Write Fabrication—A Case Study," *International Journal of Industrial Engineering*, Vol. 15, No. 1, 104-112, 2008.
3. Chappell C., Desai S., Sankar J., "Computational Modeling of a Drop-on-Demand (DOD) Inkjet System for Understanding Microdroplet Behavior," *ASME Early Career Technical Journal*, Vol. 6, No. 1, October 2007.
4. Desai S., Lovell M., "Computational Fluid Dynamic Analysis of a Direct Write Manufacturing Process," *International Journal of Nanomanufacturing*, Vol. 4, No. 3, pp. 171-188, 2009.
5. Lord Rayleigh, "On the Equilibrium of Liquid Conducting Masses Charged with Electricity", Phil. Mag., Vol. 5, 14, pp. 184-186, 1882.
6. Doyle, D. R. Moffett and B. Vonnegut, "Behavior of Evaporating Electrically Charged Droplets", J. Colloid Sci., Vol. 19, pp. 136143, 1964.
7. M. A. Abbas, and J. Latham, "The Instability of Evaporating Charged Drops," J. Fluid Mech., Vol. 30, pp. 663670, 1967.
8. J. W. Schweizer, and D. N. Hanson, "Stability Limit of Charged Drops", J. Colloid Interface Sci., Vol. 35, pp. 417423, 1971.
9. D. C. Taflin, T. L. Ward and E. J. Davis, "Electrified Droplet Fission and the Rayleigh Limit", Langmuir, Vol. 5, pp. 376384, 1989.
10. C. B. Richardson, A. L. Pigg and R. L. Hightower, "On the Stability Limit of Charged Droplets", Proc. R. Soc. Lond., A., Vol. 422, pp. 319328, 1989.
11. A. Gomez, and K. Tang, "Charge and Fission of Droplets in Electrostatic Sprays", Phys. Fluids, Vol. 6, pp. 404414, 1994.
12. Jinyoung Choi, Sangsoo Kim, "Experimental evaluation of electrodynamically focused nanoparticle behavior in the quadrupole electric field", 2007 AAAR (American Association for Aerosol Research) Annual Conference.
13. Melissa Orme, Jon Courter, Qingbin Liu, Changzheng Huang, and Robert Smith 'Electrostatic charging and deflection of non conventional droplet streams formed from capillary stream breakup, Physics of Fluids volume 12, Number 9 September 2000.
14. J. M. Schneider, N. R. Lindblad, and C. D. Hendricks, "Stability of an electrified liquid jet," J. Appl. Phys. 38, 6, 1967, 38, 2599, 1967.
15. Kim Eiroma, Liisa Hakola, Jukka Hast, Arto Maaninen and Jarno Petäjä "UV curing of electronic printing" RADTECH REPORT SEPTEMBER/OCTOBER 2007.
16. Harrop P., Developments in printed and thin film electronics, Printed Electronics, Europe 2007, Cambridge, UK, 2007.
17. UV Curing Technology: Issues for Inkjet Formulations By Jeffrey Kiang and James Balcerski, Sartomer Company, Inc. Exton, Pa. USA.
18. R. G. Sweet, "High frequency recording with electrostatically deflected ink jets," Rev. Sci. Instrum. 36, 2~1965; 36, 131, 1965.
19. J. M. Schneider, N. R. Lindblad, and C. D. Hendricks, "Stability of an electrified liquid jet," J. Appl. Phys. 38, 6, 1967; 38, 2599, 1967.
20. F. J. Kamphoefner, "Ink jet printing," IEEE Trans. Electron Devices ED-19, 584~1972.
21. G. L. Fillmore, W. L. Buehner, and D. L. West, "Drop charging and deflection in an electrostatic ink jet printer," IBM J. Res. Dev. 1, 37, 1977.
22. Melissa Orme, Jon Courter, Qingbin Liu, Changzheng Huang, and Robert Smith 'Electrostatic charging and deflection of non conventional droplet streams formed from capillary stream breakup, Physics of Fluids volume 12, Number 9 September 2000.
23. Desai S., Esho T., Kaware R., "Understanding Microdroplet Evaporation towards Scalable Micro/Nano Fabrication," Proceedings of the Industrial Engineers Research Conference, Mexico, 2010.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of generating scalable patterned features on a substrate, said method comprising:
   (a) ejecting a succession of droplets, comprising selectively applying a first force to a stream of fluid such that the stream breaks into the succession of droplets;
   (b) applying a second force to the droplets in a manner such that the droplets travel along a designated path, comprising passing the droplets through a charge tunnel and a quadrupole mechanism;
   (c) reducing the size of one or more of the droplets; and
   (d) depositing the droplets on the substrate to generate patterned features on the substrate.

2. The method of claim 1, wherein the patterned features are three-dimensional.

3. The method of claim 1, wherein the succession of droplets comprises colloids or liquefied metals of one or more materials.

4. The method of claim 1, wherein the succession of droplets is deposited via hydrophobic or hydrophilic patterns.

5. The method of claim 1 further comprising repeating (a), (b) and/or (c) at least once.

6. The method of claim 1, wherein the succession of droplets comprises polymer fluid.

7. The method of claim 1 further comprising curing or gelation of the succession of droplets.

8. The method of claim 1, wherein reducing the size of one or more of the droplets within the succession of droplets comprises reducing the size of one or more of the droplets by at least about 20%.

9. The method of claim 1, wherein reducing the size of one or more of the droplets within the succession of droplets comprises reducing the size of one or more of the droplets from 1 to 5 µm to 80 to 200 nm.

10. The method of claim 1, wherein the succession of droplets is ejected from a piezoelectric nozzle.

11. The method of claim 1, wherein passing the droplets through the charge tunnel comprises applying a variable charge potential to the succession of droplets.

12. The method of claim 1, wherein generating scalable patterned features on the substrate comprises selectively manufacturing heterogeneous structures on said substrate.

13. The method of claim 1, wherein the first force is controlled to adjust the size, velocity and/or the ejecting rate of the succession of droplets.

14. The method of claim 1, wherein ejecting the succession of droplets comprises ejecting a succession of droplets from a continuous inkjet setup.

15. The method of claim 1, wherein reducing the size of one or more droplets within the succession of droplets comprises applying a resistive heat source, a laser or a combination thereof.

16. The method of claim 3, wherein the material is selected from the group consisting of metal, ceramics, fiber glass, semiconductor material, polymers, bio-media, a precursor solution for sol-gel process and a combination thereof.

17. The method of claim 7, wherein curing is carried out by adding chemical additives, exposing to ultraviolet radiation, electron beam and/or heat.

18. The method of claim 10, wherein the piezoelectric nozzle comprises a piezoelectric disk and wherein applying the first force to the stream of fluid comprises applying a voltage to the piezoelectric disk.

19. The method of claim 10, wherein the piezoelectric nozzle has an orifice diameter of about 1 micron to 100 microns.

20. The method of claim 10, wherein the orifice size of the piezoelectric nozzle is about 100 microns.

21. The method of claim 10, wherein the piezoelectric nozzle has an orifice diameter of about 1 micron to about 10 microns.

22. The method of claim 11, wherein the depositing step comprises deflecting one or more charged droplets within the succession of droplets.

23. The method of claim 14, wherein the continuous ink jet setup comprises a piezoelectric nozzle.

24. The method of claim 15, wherein the resistive heat source, laser or combination thereof is selectively applied and/or selectively attenuated.

25. The method of claim 18, wherein applying the voltage to the piezoelectric disk comprises varying the voltage and frequency of excitation of the piezoelectric disk.

26. The method of claim 23, wherein the piezoelectric nozzle comprises a piezoelectric disk.

* * * * *

UNITED STATES PATENT AND TRADEMARK OFFICE
CERTIFICATE OF CORRECTION

PATENT NO. : 8,573,757 B2
APPLICATION NO. : 12/732435
DATED : November 5, 2013
INVENTOR(S) : Desai It is certified that error appears in the above-identified patent and that said Letters Patent is hereby corrected as shown below:

In the Specifications:
Column 6, Line 64: Please delete "continuous inkjet (CH)"
and insert -- continuous inkjet (CIJ) --

In the Claims:
Column 10, Claim 1, Lines 21-32: Please delete existing Claim 1 and insert the following:

-- A method of generating scalable patterned features on a substrate, said method comprising:
(a) ejecting a succession of droplets, comprising selectively applying a first force to a stream of fluid such that the stream breaks into the succession of droplets;
(b) applying a second force to the succession of droplets in a manner such that the succession of droplets travels along a designated path, comprising passing the succession of droplets through a charge tunnel and a quadrupole mechanism;
(c) reducing the size of one or more droplets within the succession of droplets; and
(d) depositing the succession of droplets on the substrate to generate patterned features on the substrate. --

Column 10, Claim 8, Lines 46-49: Please delete existing Claim 8 and insert the following:

-- The method of Claim 1, wherein reducing the size of one or more of the droplets within the succession of droplets comprises reducing the size of the one or more droplets within the succession of droplets by at least about 20%. --

Column 10, Claim 9, Lines 50-53: Please delete existing Claim 9 and insert the following:

-- The method of claim 1, wherein reducing the size of one or more droplets within the succession of droplets comprises reducing the size of the one or more droplets within the succession of droplets from 1 to 5 μm to 80 to 200 nm. --

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,573,757 B2

Column 10, Claim 11, Line 56:
    Please delete "wherein passing the droplets"
       and insert -- wherein passing the succession of droplets --

Column 10, Claim 14, Line 66:
    Please delete "ejecting a succession of droplets"
       and insert -- ejecting the succession of droplets --